UNITED STATES PATENT OFFICE.

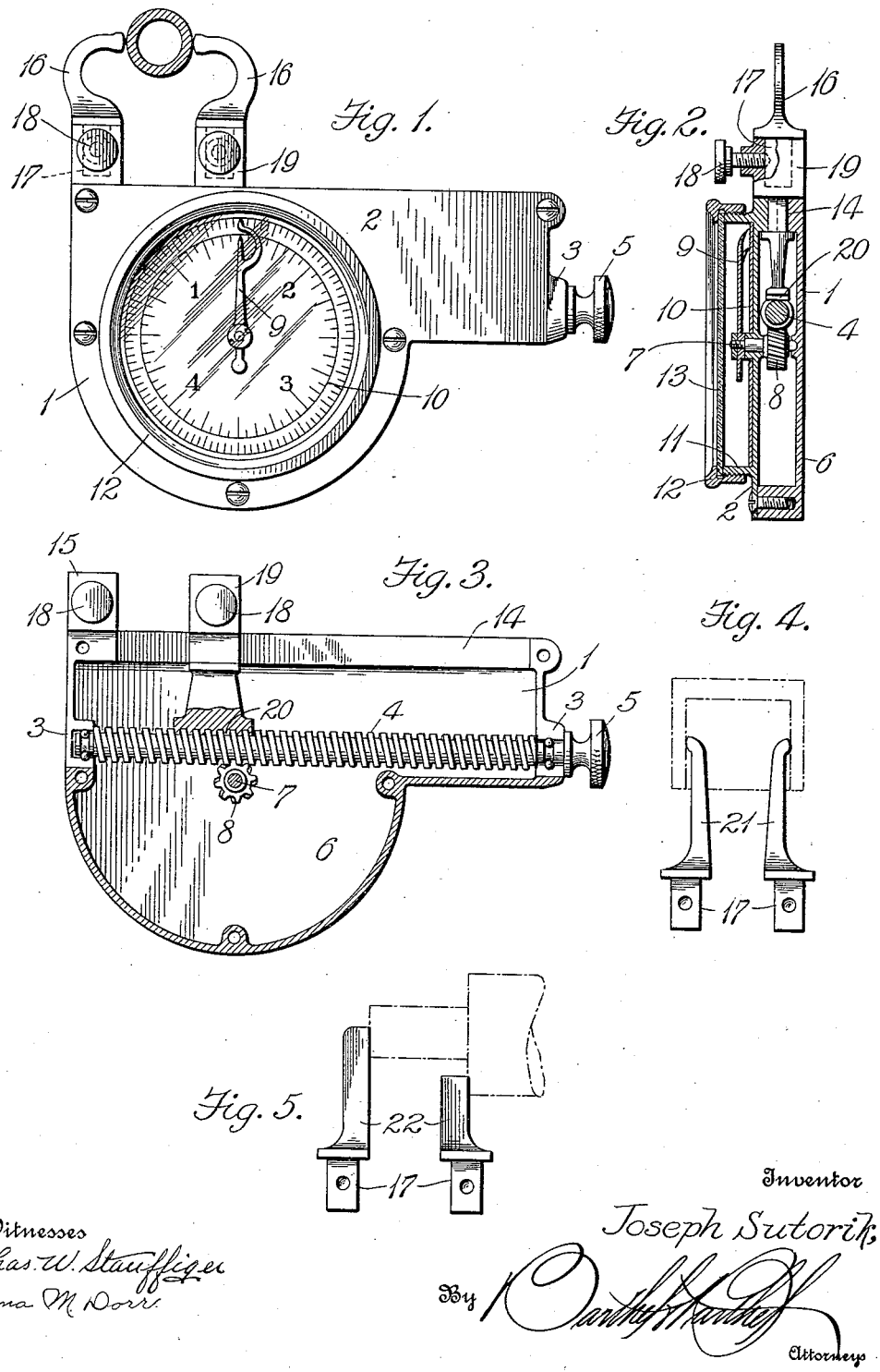

JOSEPH SUTORIK, OF DETROIT, MICHIGAN.

MICROMETER-GAGE.

1,065,744.

Specification of Letters Patent.

Patented June 24, 1913.

Application filed December 23, 1912. Serial No. 738,125.

*To all whom it may concern:*

Be it known that I, JOSEPH SUTORIK, a subject of the King of Hungary, residing at Detroit, in the county of Wayne and State of Michigan, have invented certain new and useful Improvements in Micrometer-Gages, of which the following is a specification, reference being had therein to the accompanying drawings.

This invention relates to improvements in gages and its object is to provide a simple and convenient device having detachable caliper arms, whereby the gage may be used as an inside or an outside caliper gage as well as to serve the purpose of the ordinary micrometer gage, and further to provide a simple and convenient construction having a dial upon which the reading may be plainly seen.

A further object is to provide certain other new and useful features in the construction and arrangement of parts, the invention consisting in the matters hereinafter set forth and more particularly pointed out in the claims, reference being had to the accompanying drawings, in which—

Figure 1 is a side elevation of a device embodying the invention; Fig. 2 a transverse section of the same; Fig. 3, a side elevation with the cover plate removed; Fig. 4 is a detail of inside caliper arms adapted for use with the gage; and Fig. 5, a similar detail of plan arms for use in taking other measurements.

As shown in the drawing, 1 represents a suitable casing having a cover 2 for closing the open side thereof and provided with bearings 3 in its ends for a screw-shaft 4. This shaft is provided with a knurled head 5 on its outer end for turning the same and positioned in the center of a semicircular enlargement 6 of the casing is a shaft 7 extending at right angles to the shaft 4 and provided with a worm gear 8 to engage the shaft. On the outer end of said shaft 7 is secured a pointer 9 revoluble over a dial 10 located within a suitable circular chamber formed by a laterally extending flange 11 on the cover 2. This dial is provided with two scales or rows of graduations, one of which is preferably marked to indicate tenths, hundredths, or thousands, as desired, and the other to indicate inches and fractions thereof, the hand 9 being formed with two points passing over the graduations. The flange 11 is preferably screw-threaded to receive a ring 12 which holds a transparent wall 13 of glass or other suitable material to close the chamber and protect the dial and index hand from injury.

The upper edge of the casing 1 is formed with a longitudinal slot 14 and at one end of this slot is a fixed socket 15 adapted to receive and hold a caliper arm 16 which has a shank 17 to engage the socket and is detachably held thereon by a set screw 18. A movable socket member 19 is mounted to slide freely in the slot 14 toward and from the fixed socket and is adapted to receive and detachably hold a like caliper arm. The movable member 19 is formed at its inner end with teeth 20 to engage the screw-shaft 4 so that when the said shaft is turned by means of its head 5, said movable member will be moved thereby along the slot in the casing. The screw-shaft and gear 8 are accurately formed so that the movement of the socket member and its caliper arm will be accurately indicated upon the dial by the indicating hand.

In Figs. 4 and 5, are shown caliper arms 21 and 22 of different shape from those shown in Fig. 1, the arms 21 serving as inside calipers, and the arms 22 being employed when it is desired to measure the distance between certain surfaces, as on a piece of work indicated in dotted lines.

By making the caliper arms detachable from the gage, either inside or outside dimensions may be readily ascertained by simply securing the necessary arms in their sockets and the particular arrangement of dial permits of making the graduations far enough apart so that they may be readily seen. The form of the gage makes it particularly adaptable for machinists' work and a comparatively wide range of adjustment is secured with a small pocket tool.

Obviously changes may be made in the construction and arrangement of parts without departing from the spirit of my invention and I do not wish to limit myself to the particular form or arrangement shown.

Having thus fully described my invention what I claim is:—

1. In a gage, the combination of a casing having a slot in one edge extending from end to end of the casing, a screw shaft in the casing extending longitudinally of the slot, means exteriorly of the casing on the shaft for turning the same, a fixed member on the casing at one end of the slot, a movable member extending into the casing into engagement with said screw shaft and adapted to be moved thereby along the slot toward and from the fixed member, caliper arms carried by said members, a dial on the casing at one side of the screw shaft, a transverse shaft in the casing with one of its ends projecting through the center of the dial, a worm gear on the transverse shaft engaging the screw shaft, and an indicator arm on the projecting end of the transverse shaft to sweep over the dial.

2. In a micrometer gage, the combination of a casing having a longitudinal slot in one edge and formed with a semi-circular enlargement at its opposite edge, bearings in the ends of the casing, a screw shaft mounted in said bearings and extending parallel with the edge of the casing in which the slot is provided, a head on the outer end of the screw shaft for turning the same, a fixed socket member on the casing at the end of the slot, a socket member movable longitudinally in the slot and provided with teeth at its inner end to engage the screw shaft, caliper arms detachably secured within the socket members, a transverse shaft mounted in the axis of the semi-circular enlargement of the casing, a worm gear on the transverse shaft in engagement with the screw shaft, a cover to close one side of the casing, provided with a laterally extending annular flange forming a chamber on the cover into which one end of the transverse shaft extends, a dial within said chamber formed by the flange, an index hand on one end of the transverse shaft to sweep over the dial, and a transparent closure engaging the flange and closing the chamber to protect the dial and index hand.

In testimony whereof I affix my signature in presence of two witnesses.

JOSEPH SUTORIK.

Witnesses:
   Lewis E. Flanders,
   Anna M. Dorr.

---

Copies of this patent may be obtained for five cents each, by addressing the "Commissioner of Patents, Washington, D. C."